US012738001B2

(12) United States Patent
Groueix et al.

(10) Patent No.: US 12,738,001 B2
(45) Date of Patent: Sep. 15, 2026

(54) HYBRID OBJECT CONSTRUCTIONS BASED ON IMPLICIT AND EXPLICIT REPRESENTATIONS

(71) Applicant: Adobe Inc., San Jose, CA (US)

(72) Inventors: Thibault Groueix, San Francisco, CA (US); Vladimir Kim, Seattle, WA (US); Noam Aigerman, San Francisco, CA (US); Amir Zvi Barda, Rishon Lezion (IL)

(73) Assignee: Adobe Inc., San Jose, CA (US)

( * ) Notice: Subject to any disclaimer, the term of this patent is extended or adjusted under 35 U.S.C. 154(b) by 106 days.

(21) Appl. No.: 18/882,302

(22) Filed: Sep. 11, 2024

(65) Prior Publication Data

US 2026/0073650 A1 Mar. 12, 2026

(51) Int. Cl.
*G06T 19/20* (2011.01)
*G06T 17/20* (2006.01)

(52) U.S. Cl.
CPC .............. *G06T 19/20* (2013.01); *G06T 17/20* (2013.01); *G06T 2200/24* (2013.01); *G06T 2219/2008* (2013.01)

(58) Field of Classification Search
CPC ....... G06T 19/20; G06T 19/00; G06T 19/006; G06T 17/20; G06T 17/00; G06T 17/005; G06T 17/205; G06T 15/00; G06T 15/005; G06T 15/04; G06T 15/08; G06T 15/80; G06T 15/205; G06T 2200/24; G06T 2219/2008
See application file for complete search history.

(56) References Cited

U.S. PATENT DOCUMENTS 11,514,638 B2 * 11/2022 Lafer ......................... G06T 7/50
12,307,600 B2 * 5/2025 Mech ......................... G06T 5/60
12,469,194 B2 * 11/2025 Hold-Geoffroy ....... G06T 7/194
12,482,172 B2 * 11/2025 Hold-Geoffroy ....... G06T 15/60
(Continued)

OTHER PUBLICATIONS

Adobe, , "Substance 3D Modeler", adobe.com, [retrieved from the internet on Nov. 21, 2024], <https://www.adobe.com/ie/products/substance3d/apps/modeler.html>, 2024, 9 pages.
(Continued)

*Primary Examiner* — Vijay Shankar
(74) *Attorney, Agent, or Firm* — FIG. 1 Patents

(57) ABSTRACT

Techniques for using hybrid object constructions based on implicit and explicit representations are described. In an example, a processing device is operable to obtain a mesh that models an exterior surface of a simulated object, generate a neural representation of the exterior surface, and receive a user input that indicates a requested modification to one or more surface regions of the mesh. The processing device is further operable to incrementally update, using a machine-learning model, the surface regions of the mesh based on incremental changes applied by the machine-learning model to the neural representation for achieving the requested modification within corresponding portions of the exterior surface of the neural representation. The processing device is further operable to output the updated mesh for use in rendering the simulated object with the requested modification.

20 Claims, 7 Drawing Sheets

(56) References Cited

U.S. PATENT DOCUMENTS

2022/0068007 A1* 3/2022 Lafer ........................ G06T 7/50
2024/0312122 A1* 9/2024 Moenne-Loccoz .......................... G06T 15/506
2025/0157114 A1* 5/2025 Yuan ....................... G06T 13/40

OTHER PUBLICATIONS

Anonymous, , “MagicClay: Supplementary Material”, Anon. Submission Id: 616, 2024, 4 pages.
Autodesk, , “Autodesk Mudbox: Sculpt detailed characters and models”, autodesk.com, [retrieved from the internet on Nov. 20, 2024], <https://www.autodesk.com/products/mudbox/overview?term=1-YEAR&tab=subscription>, 2024, 5 pages.
Barda, Amir et al., “MagicClay: Sculpting Meshes With Generative Neural Fields”, Cornell University, arXiv.org, [retrieved from the internet on Nov. 20, 2024], <https://arxiv.org/pdf/2403.02460>, Oct. 9, 2024, 10 pages.
Barda, Amir et al., “ROAR: Robust Adaptive Reconstruction of Shapes Using Planar Projections”, Cornell University, arXiv.org, [retrieved from the internet on Nov. 20, 2024], <https://arxiv.org/pdf/2307.00690>, Jul. 3, 2023, 12 pages.
Barda, Amir et al., “Text-to-3D via Coupled Implicit and Explicit Representations”, Conference acronym ’XX, Jun. 3-5, 2018, Woodstock, NY, Jun. 2018, 8 pages.
Biermann, Henning et al., “Cut-and-Paste Editing of Multiresolution Surfaces”, NYU Courant Institute, [retrieved from the internet on Nov. 20, 2024], <https://cims.nyu.edu/gcl/papers/biermann2002cem.pdf>, 2002, 10 pages.
Blender, , Blender, Blender.org [retrieved Nov. 20, 2024]. Retrieved from the Internet <https://www.blender.org/>., 2024, 11 pages.
Botsch, Mario et al., “A Remeshing Approach to Multiresolution Modeling”, Eurographics Symposium on Geometry Processing [retrieved from the internet on Nov. 22, 2024], <https://www.graphics.rwth-aachen.de/media/papers/remeshing1.pdf>, 2004, 8 pages.
Brooks, Tim et al., “InstructPix2Pix: Learning to Follow Image Editing Instructions”, Cornell University, arXiv,org preprint [retrieved from the internet Aug. 7, 2024], <https://arxiv.org/pdf/2211.09800>, 2023, 15 pages.
Chen, Hansheng et al., “Generic 3D Diffusion Adapter Using Controlled Multi-View Editing”, Cornell University, arXiv.org, [retrieved from the internet on Nov. 20, 2024], <https://arxiv.org/pdf/2403.12032>, Mar. 19, 2024, 12 pages.
Chen, Rui et al., “Fantasia3D: Disentangling Geometry and Appearance for High-quality Text-to-3D Content Creation”, Cornell University, arXiv.org, [retrieved from the internet on Oct. 25, 2024], <https://arxiv.org/pdf/2303.13873>, Sep. 27, 2023, 11.
Chen, Zhiqin et al., “Learning Implicit Fields for Generative Shape Modeling”, Cornell University arXiv, arXiv.org [retrieved Mar. 16, 2023]. Retrieved from the Internet <https://arxiv.org/pdf/1812.02822.pdf>., Sep. 16, 2019, 10 Pages.
Crane, Keenan et al., “Robust fairing via conformal curvature flow”, cmu.edu, [retrieved from the internet on Nov. 22, 2024], <https://www.cs.cmu.edu/~kmcrane/Projects/ConformalWillmoreFlow/paper.pdf>, Jul. 21, 2013, 10 pages.
DeepFloyd IF, , “DeepFloyd IF”, [retrieved from the internet on Nov. 24, 2024]. <https://huggingface.co/docs/diffusers/en/api/pipelines/deepfloyd_if>, 2023, 31 pages.
Funkhouser, Thomas et al., “Modeling by Example”, acm.org, [retrieved from the internet on Nov. 20, 2024], <https://dl.acm.org/doi/pdf/10.1145/1186562.1015775>, 2004, 12 pages.
Gal, Rinon et al., “An Image is Worth One Word: Personalizing Text-to-Image Generation using Textual Inversion”, Cornell University, arXiv.org, [retrieved from the internet on Sep. 20, 2024], <https://arxiv.org/pdf/2208.01618>, Aug. 2, 2022, 26 pages.
Gao, William , “TextDeformer: Geometry Manipulation using Text Guidance”, Cornell University, arXiv.org, [retrieved from the internet on Nov. 20, 2024], <https://arxiv.org/pdf/2304.13348>, Apr. 26, 2023, 9 pages.
Garland, Michael et al., “Surface Simplification Using Quadric Error Metrics”, Computer graphics and interactive techniques [retrieved Mar. 16, 2023]. Retrieved from the Internet <https://dl.acm.org/doi/pdf/10.1145/258734.258849>., 1997, 8 pages.
Gropp, Amos et al., “Implicit Geometric Regularization for Learning Shapes”, Cornell University, arXiv.org, [retrieved from the internet on Nov. 20, 2024], <https://arxiv.org/pdf/2002.10099>, Jul. 9, 2020, 14 pages.
Guo, Yuan-Chen et al., “ThreeStudio: a unified framework for 3D content generation”, [retrieved from the internet on Nov. 21, 2024], <Https://github.com/threestudio-project/threestudio>, 2023, 17 pages.
Hanocka, Rana et al., “Point2Mesh: a Self-Prior for Deformable Meshes”, ACM Trans. Graph., vol. 39, No. 4, Article 126, [retrieved from the internet on Nov. 22, 2024], <https://dl.acm.org/doi/pdf/10.1145/3386569.3392415>, Jul. 2020, 12 pages.
Haque, Ayaan et al., “Instruct-NeRF2NeRF: Editing 3D Scenes with Instructions”, Cornell University, arXiv.org, [retrieved from the internet on Nov. 20, 2024], <https://arxiv.org/pdf/2303.12789>, Jun. 1, 2023, 13 pages.
Jacobson, Alec et al., “Skinning: Real-time Shape Deformation”, ACM SIGGRAPH 2014 Courses, 2014, 94 pages.
Kalogerakis, Evangelos et al., “A Probabilistic Model for Component-Based Shape Synthesis”, researchgate.net, [retrieved from the internet on Nov. 20, 2024], <https://www.researchgate.net/publication/256663170_A_Probabilistic_Model_of_Component-Based_Shape_Synthesis>, Jul. 2012, 11 pages.
Kanazawa, Angjoo et al., “Learning Category-Specific Mesh Reconstruction from Image Collections”, Cornell University, arXiv.org, [retrieved from the internet on Nov. 21, 2024], <https://arxiv.org/pdf/1803.07549>, Jul. 30, 2018, 21 pages.
Kobbelt, Leif , “Sqrt(3)-Subdivision”, AMC Digital Library, acm.org, [retrieved from the internet on Nov. 21, 2024], <https://dl.acm.org/doi/pdf/10.1145/344779.344835>, Jul. 1, 2000, 10 pages.
Laine, Samuli et al., “Modular Primitives for High-Performance Differentiable Rendering”, Cornell University, arXiv.org, [retrieved from the internet on Oct. 4, 2024], <https://arxiv.org/pdf/2011.03277>, Nov. 6, 2020, 14 pages.
Li, J. et al., “INSTANT3D: Fast Text-to-3D With Sparse-View Generation and Large Reconstruction Model”, Cornell University arXiv Preprint, arXiv.org [retrieved Jul. 21, 2024]. Retrieved from the Internet <https://arxiv.org/pdf/2311.06214>., Nov. 23, 2023, 25 pages.
Li, Ruilong et al., “NerfAcc: Efficient Sampling Accelerates NeRFs”, Cornell University, arXiv.org, [retrieved from the internet on Nov. 22, 2024], <https://arxiv.org/pdf/2305.04966>, Oct. 24, 2023, 11 pages.
Liang, Ruofan et al., “SPIDR: SDF-based Neural Point Fields for Illumination and Deformation”, Cornell University, arXiv.org, [retrieved from the internet on Nov. 22, 2024], <https://arxiv.org/pdf/2210.08398>, Apr. 7, 2023, 21 pages.
Lin, Chen-Hsuan et al., “Magic3D: High- Resolution Text-to-3D Content Creation”, Cornell University arXiv, arXiv.org [retrieved Aug. 9, 2023]. Retrieved from the Internet <https://arxiv.org/pdf/2211.10440.pdf>., Mar. 25, 2023, 18 Pages.
Loper, Matthew et al., “SMPL: a skinned multi-person linear model”, ACM Transactions on Graphics, vol. 34, No. 6 [retrieved Feb. 19, 2023]. Retrieved from the Internet <https://www.researchgate.net/publication/287815055_SMPL_a_skinned_multi-person_linear_model>., Nov. 2, 2015, 16 Pages.
Lorensen, William E. et al., “Marching Cubes: a High Resolution 3D Surface Construction Algorithm”, Retrieved from <http://fab.cba.mit.edu/classes/S62.12/docs/Lorensen_marching_cubes.pdf>, 1987, 7 pages.
Metzer, Gal et al., “Latent-NeRF for Shape-Guided Generation of 3D Shapes and Textures”, Cornell University, arXiv.org, [retrieved from the internet on Oct. 25, 2024], <https://arxiv.org/pdf/2211.07600>, Nov. 14, 2022, 11 pages.
Mikaeili, Aryan et al., “SKED: Sketch-guided Text-based 3D Editing”, Cornell University, arXiv.org, [retrieved from the internet on Nov. 21, 2024], <https://arxiv.org/pdf/2303.10735>, Aug. 18, 2023, 17 pages.
Mildenhall, Ben et al., “NeRF: Representing Scenes as Neural Radiance Fields for View Synthesis”, Cornell University arXiv,

(56) References Cited

OTHER PUBLICATIONS arXiv.org [retrieved Mar. 19, 2023]. Retrieved from the Internet <https://arxiv.org/pdf/2003.08934.pdf>., Aug. 3, 2020, 25 Pages.

Müller, Thomas et al., "Instant Neural Graphics Primitives with a Multiresolution Hash Encoding", Cornell University arXiv, arXiv.org [retrieved Mar. 19, 2023]. Retrieved from the Internet <https://arxiv.org/pdf/2201.05989.pdf>., May 4, 2022, 15 Pages.

Nicolet, Baptiste et al., "Large Steps in Inverse Rendering of Geometry", ACM Trans. Graph., vol. 40, No. 6, Article 248, [retrieved from the internet on Nov. 22, 2024], <https://rgl.s3.eu-central-1.amazonaws.com/media/papers/Nicolet2021Large.pdf>, Dec. 2021, 13 pages.

Palfinger, Werner et al., "Continuous remeshing for inverse rendering", onlinelibrary.wiley.com, [retrieved from the internet on Nov. 21, 2024], <https://onlinelibrary.wiley.com/doi/epdf/10.1002/cav.2101>, Jun. 20, 2022, 18 pages.

Park, Jeong Joon et al., "DeepSDF: Learning Continuous Signed Distance Functions for Shape Representation", Cornell University arXiv, arXiv.org [retrieved Mar. 16, 2023]. Retrieved from the Internet <https://arxiv.org/pdf/1901.05103.pdf>., Jan. 16, 2019, 19 Pages.

Peng, Mengqi et al., "Autocomplete 3D sculpting", ACM Transactions on Graphics, vol. 37, No. 4 [retrieved Jun. 14, 2022]. Retrieved from the Internet <https://www.researchgate.net/profile/Li-Yi-Wei/publication/315710380_Autocomplete_3D_Sculpting/links/5fde597745851553a0d5b4ae/Autocomplete-3D-Sculpting.pdf>., Jul. 30, 2018, 10 pages.

Poole, Ben et al., "Dreamfusion: Text-to-3D Using 2D Diffusion", Cornell University, arXiv.org, [retrieved from the internet on Oct. 25, 2024], <https://arxiv.org/pdf/2209.14988>, Sep. 29, 2022, 18.

Poursaeed, Omid et al., "Coupling Explicit and Implicit Surface Representations for Generative 3D Modeling", Cornell University, arXiv.org, [retrieved from the internet on Nov. 21, 2024], <https://arxiv.org/pdf/2007.10294>, Oct. 17, 2020, 17 pages.

Qian, Guocheng , "Magic123: One Image to High-Quality 3D Object Generation Using Both 2D and 3D Diffusion Priors", Cornell University, arXiv.org, [retrieved from the internet on Nov. 21, 2024], <https://arxiv.org/pdf/2306.17843>, Jul. 23, 2023, 18 pages.

Rakotosaona, Marie-Julie et al., "NeRFMeshing: Distilling Neural Radiance Fields into Geometrically-Accurate 3D Meshes", Cornell University, arXiv.org, [retrieved from the internet on Oct. 25, 2024], <https://arxiv.org/pdf/2303.09431>, Mar. 16, 2023, 11 pages.

Rombach, Robin et al., "High-Resolution Image Synthesis with Latent Diffusion Models", Cornell University arXiv, arXiv.org [retrieved Aug. 11, 2023]. Retrieved from the Internet <https://arxiv.org/pdf/2112.10752.pdf>., Apr. 13, 2022, 45 Pages.

Salvati, Gabriele et al., "MeshHisto: collaborative modeling by sharing and retargeting editing histories", ACM Transactions on Graphics (TOG), vol. 34, No. 6, Nov. 2, 2015, 10 pages.

Schmidt, Ryan et al., "Interactive Decal Compositing with Discrete Exponential Maps", oregonstate.edu, [retrieved from the internet on Nov. 21, 2024], <https://web.engr.oregonstate.edu/~grimmc/content/papers/sig2006tm/sig2006tm.pdf>, 2006, 9 pages.

Sella, Etai et al., "Vox-E: Text-guided Voxel Editing of 3D Objects", Cornell University, arXiv.org, [retrieved from the internet on Nov. 21, 2024], <https://arxiv.org/pdf/2303.12048>, Sep. 19, 2023, 17 pages.

Shen, Tianchang et al., "Deep Marching Tetrahedra: a Hybrid Representation for High-Resolution 3D Shape Synthesis", Cornell University, arXiv.org, [retrieved from the internet on Oct. 25, 2024], <https://arxiv.org/pdf/2111.04276>, Nov. 8, 2021, 13 pages.

Shi, Yichun et al., "MVdream: Multi-View Diffusion for 3D Generation", Cornell University, arXiv.org, [retrieved from the internet on Nov. 21, 2024], <https://arxiv.org/pdf/2308.16512>, Apr. 18, 2024, 21 pages.

Sun, Jingxiang et al., "Dreamcraft3D: Hierarchical 3D Generation With Bootstrapped Diffusion Prior", Cornell University, arXiv.org, [retrieved from the internet on Nov. 22, 2024], <https://arxiv.org/pdf/2310.16818>, Oct. 26, 2023, 20 pages.

Tsalicoglou, Christina et al., "TextMesh: Generation of Realistic 3D Meshes From Text Prompts", Cornell University, arXiv.org, [retrieved from the internet on Nov. 21, 2024], <https://arxiv.org/pdf/2304.12439>, Apr. 24, 2023, 10 pages.

Turki, Haithem , "HybridNeRF: Efficient Neural Rendering via Adaptive Volumetric Surfaces", openaccess.thecvf.com, [retrieved from the internet on Nov. 21, 2024], <https://openaccess.thecvf.com/content/CVPR2024/papers/Turki_HybridNeRF_Efficient_Neural_Rendering_via_Adaptive_Volumetric_Surfaces_CVPR_2024_paper.pdf>, 2024, 10 pages.

Wang, Guangcong et al., "SparseNeRF: Distilling Depth Ranking for Few-shot Novel View Synthesis", Cornell University, arXiv.org, [retrieved from the internet on Nov. 20, 2024], <https://arxiv.org/pdf/2303.16196>, Aug. 13, 2023, 18 pages.

Wang, Zhengyi et al., "ProlificDreamer: High-Fidelity and Diverse Text-to-3D Generation with Variational Score Distillation", Cornell University, arXiv.org, [retrieved from the internet on Oct. 25, 2024], <https://arxiv.org/pdf/2305.16213>, Nov. 22, 2023, 36 pages.

Wang, Zian et al., "Adaptive Shells for Efficient Neural Radiance Field Rendering", Cornell University, arXiv.org, [retrieved from the internet on Nov. 21, 2024], <https://arxiv.org/pdf/2311.10091>, Nov. 16, 2023, 19 pages.

Yariv, Lior et al., "Volume Rendering of Neural Implicit Surfaces", Cornell University, arXiv.org, [retrieved from the internet on Oct. 25, 2024], <https://arxiv.org/pdf/2106.12052>, Dec. 1, 2021, 19 pages.

Yuksel, Cem et al., "Mesh Colors", Apr. 2010, 11 pages.

Yumer, Mehmet Ersin et al., "Semantic Shape Editing Using Deformation Handles", oregonstate.edu, [retrieved from the internet on Nov. 21, 2024], <https://web.engr.oregonstate.edu/~mjb/cs550/Projects/Papers/CSemanticShapeEditing.pdf>, Aug. 2015, 12 pages.

Zbrush, , "ZBrush", maxon.net [retrieved from the internet on Nov. 21, 2024], <https://www.maxon.net/en/zbrush>, 2024, 13 pages.

Zhu, Junzhe et al., "HIFA: High-Fidelity Text-to-3D Generation With Advanced Diffusion Guidance", Cornell University, arXiv.org, [retrieved from the internet on Nov. 21, 2024], <https://arxiv.org/pdf/2305.18766>, Mar. 11, 2024, 25 pages.

Zhuang, Jingyu et al., "DreamEditor: Text-Driven 3D Scene Editing with Neural Fields", Cornell University, arXiv.org, [retrieved from the internet on Nov. 21, 2024], <https://arxiv.org/pdf/2306.13455>, Sep. 7, 2023, 10 pages.

* cited by examiner

602
Obtain a mesh that models an exterior surface of a simulated object

604
Generate a neural based representation of the exterior surface

606
Receive a user input that indicates a requested modification to one or more surface regions of the mesh 608
Use a machine-learned model to incrementally update the surface regions of the mesh based on incremental changes applied by the machine-learned model to the neural based representation for achieving the requested modification within corresponding portions of the exterior surface of the neural based representation 610
Output the updated mesh for use in rendering the simulated object with the requested modification

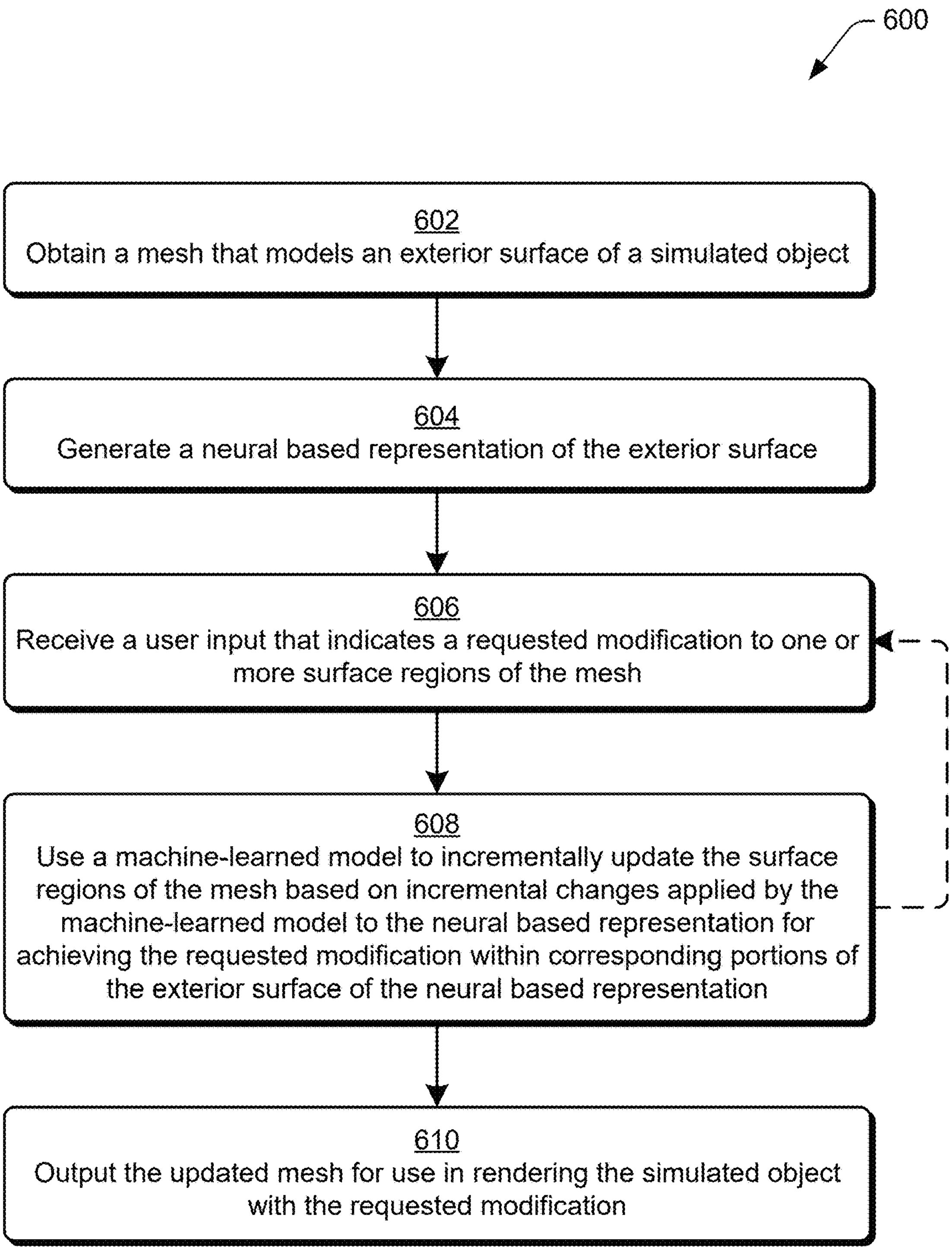

FIG. 6

HYBRID OBJECT CONSTRUCTIONS BASED ON IMPLICIT AND EXPLICIT REPRESENTATIONS

BACKGROUND

Conventional three dimensional (3D) modeling tools involve expenditure of substantial amounts of time and manual effort to produce digital content depicting realistic visuals of simulated environments. In an example involving mesh-based modeling, explicit representations (e.g., meshes) are used to model attributes of simulated objects based on data structures designed to enable realistic rendering. Conventional techniques used by computing devices to implement mash-based modeling, however, involve significant amounts of user interaction to define and edit a mesh to achieve a desired result. Accordingly, conventional three dimensional modeling tools result in an inefficient use of both user and computational resources to implement, often relying on detailed knowledge and user experience and thus are unapproachable to casual users.

SUMMARY

Hybrid object construction techniques are described that address conventional technical challenges through use of implicit and explicit representations of three dimensional objects. These techniques support an ability to depict realistic interactions between 3D objects and a simulated environment. In an example, a content processing system is operable to implement the described techniques to improve efficiency in manipulating (e.g., sculpting, smoothing, simplifying) object attributes and features represented by a mesh. A machine-learning model, such as a generative artificial intelligence (AI) model, is used by the content processing system to drive automatic updates to the mesh in response to receiving a natural language prompt specifying changes to the object attributes and features defined by the mesh. Based on the prompt, the AI model automatically modifies a neural representation of the mesh. As the AI model changes the neural representation, the AI model is operable to synchronize updates that are automatically applied to the mesh. In one or more aspects, the generative AI model deploys differential rendering techniques that supervise a loss function between iterative updates of the neural representation with corresponding updates to the mesh. Over time, the synchronized iterative updates to the different representations enable the content processing system to achieve a user requested modification that is mirrored in both the neural representation and the mesh.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 6 is a flow diagram depicting an algorithm as a step-by-step procedure, which is performable by a processing device to use hybrid object constructions based on implicit and explicit representations.

DETAILED DESCRIPTION

Overview

Figure 1:
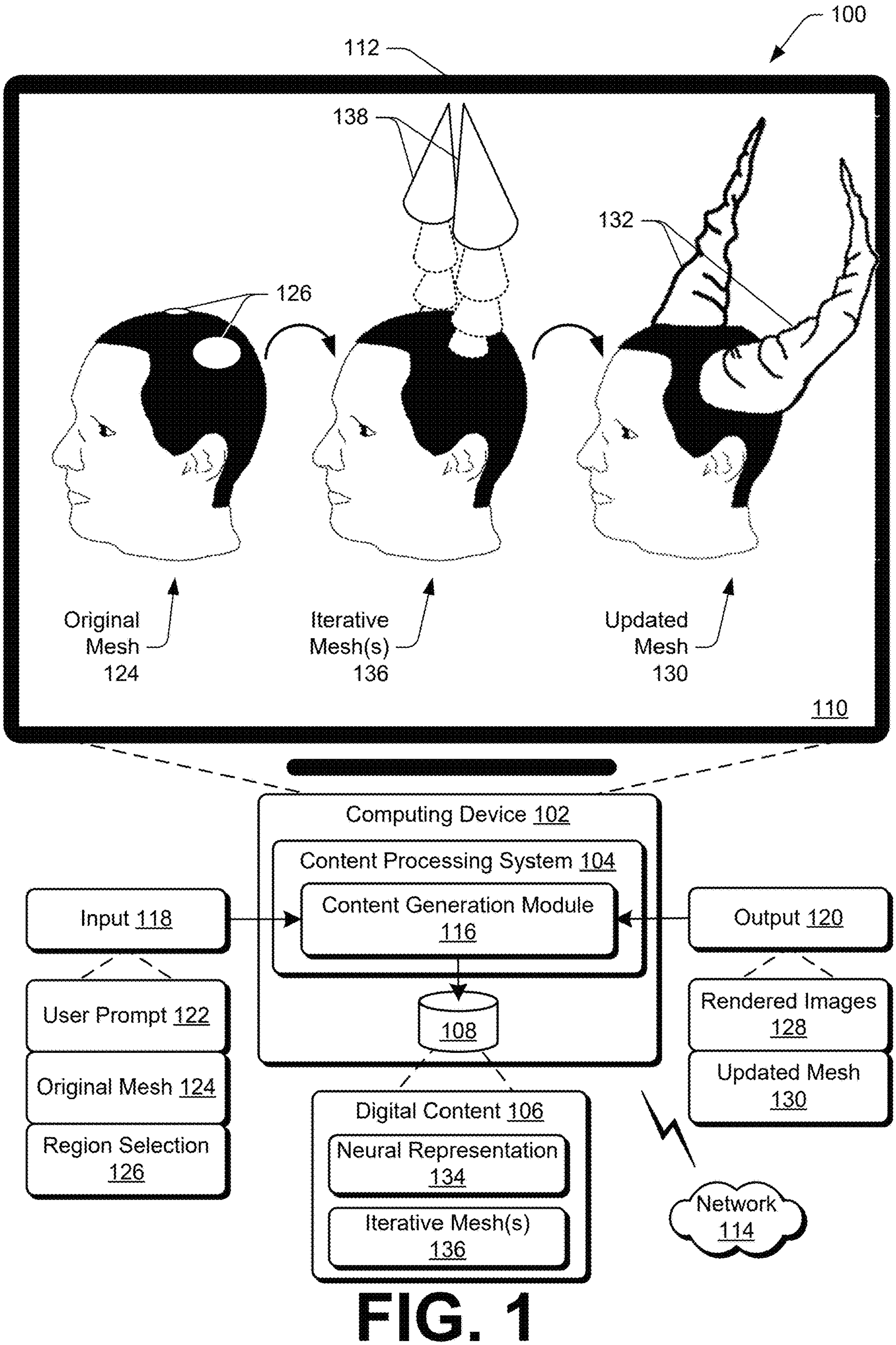
FIG. 1 is an illustration of a digital medium environment in an example implementation that is operable to employ techniques described herein for using hybrid object constructions based on implicit and explicit representations.

Production of realistic digital content is enabled by three-dimensional (3D) modeling tools. Game development, movie and television production, and digital marketing are areas where innovation and creativity are being driven by recent advances in 3D modeling tools.

Mesh-based modeling, a popular 3D modeling technique, uses meshes. Meshes are explicit representations of 3D objects depicted in digital content of simulated environments or scenes. Each mesh is a data structure that is portable or transferable, defining an arrangement of surface regions. These regions delineate an exterior surface and/or volumetric representation of a 3D object. For instance, a character in a video game is modeled using one or more meshes to convey the appearance of various physical features, props, and other aspects of the character when inserted in a simulated environment of the game. Each surface region modeled by a mesh is associated with at least one object primitive. The object primitives are arranged or combined to model the exterior shape and attributes of a 3D surface.

Mesh-based modeling supports numerous benefits. Meshes, for instance, are highly compatible with existing content production tools (e.g., rendering tools) that receive explicit representations as inputs. A mesh's arrangement of object primitives and embedded attributes configure a renderer to convey variation in the object's appearance from different viewpoints or camera angles. Meshes with higher quality (e.g., high resolution, highly detailed) are usable to increase realism and accuracy of object appearances in rendered scenes of a simulated environment, including under dynamic conditions. Conventional mesh-based modeling tools allow a user to have fine control over surface details of an object (e.g., to change object primitive vertices, edges, and shapes) and control the final appearance to achieve flexible designs. In digital animation and gaming production environments, for instance, mesh-based modeling tools enable efficient shape creation based on user inputs that sculpt, smooth, simplify, or directly manipulate the surface regions of the mesh.

Conventional mesh-based content creation, however, is resource-intensive involving significant amounts of user interaction to define and edit a mesh to achieve a desired result. Users (e.g., graphic artists) expend substantial amounts of time and manual effort to develop skills for efficiently constructing mesh-based models. The quality of the digital content generated based on a mesh heavily depends on the quality and care taken in precisely tuning the mesh. Even once these skills are developed, experienced users labor over fine-tuning a mesh to achieve a heightened level of resolution, e.g., in detail and realism. Teams of experienced users, for instance, can spend months and even years manually manipulating individual meshes to fine tune appearance details of multiple 3D objects that appear in and out of complex scenes.

Generative artificial intelligence (AI) is being explored as an alternative to mesh-based modeling for digital content production. Generative AI tools enable inexperienced users and less skilled artists to refine details of digital content to achieve a seemingly high-quality production, based on natural language prompts and follow-up prompts. For example, generative AI systems are capable of creating high quality scene renderings based on short text-based or voice-based prompts from a user, including to automatically insert or remove objects and other visual aspects. Generative AI tools are useful to artists and content creators for exploring new artistic styles, experimenting with different forms of production and publication, and collaborating with the generative AI tool to spark a user's creative process in creating stunning visuals with greater efficiency, e.g., fewer manual inputs. In simulations, animations, and video-based productions, various generative AI systems are further used to embed additional features in the digital content, such as sound effects, musical soundtracks, closed captioning, and robust audio descriptions of visual aspects rendered for a scene. However, professional artists and producers of digital content are reluctant to abandon mesh-based modeling for AI-based modeling due to various limitations of existing generative AI solutions.

Conventional AI-based modeling tools, for instance, often struggle with understanding a desired context for a scene or generating digital content to accurately convey a complex or nuanced situation. Improving responsiveness of a generative AI model in one or more examples includes expending extensive resources attempting to re-train the generative AI model to correctly interpret user prompts. In contrast, mesh-based modeling tools facilitate efficient user updates to meshes that more easily address these nuances. A final appearance of a design produced from an implicit representation depends on the generative AI model having correctly interpreted a series of user prompts. The finalized design is not easily editable. A user, for example, may not be able to directly control how a generative AI model applies a requested modification, which risks introducing unwanted AI-artifacts that accidentally alter other areas of an object surface. For instance, when updating a design represented by a mesh-based 3D model, artists alter geometry, textures, or topology. An expectation of the artist is that the mesh retains prior attributes of the modeled surface in regions that are outside the scope of the update. This level of control is currently not feasible (e.g., at least not without great difficulty in specifying complex input prompts) with the implicit representations adopted by conventional generative AI models.

Implicit representations are not practically portable in the way mesh-based models are. Mesh models are stored as self-contained data structures (e.g., data files) that are transmittable and sharable among computing resources, e.g., over the internet. In contrast to a mesh, packaging and/or compressing a generative AI model into a format suitable for download or transmission is not feasible. Generative AI models are incompatible with existing production tools adapted to render based on surface attributes represented by a mesh. Conventional rendering tools expect mesh inputs and are not configured to generate digital content based on neural representations or other implicit representations created from generative AI-modeling, partially for the issues discussed above regarding portability.

Accordingly, techniques for using hybrid object constructions based on implicit and explicit representations are described to enable efficient creation of digital content, including to depict realistic interactions between 3D objects and a simulated environment. In an example, a computing device receives, as input, a scene geometry containing spatiality data that is indicative of various geometric objects included in a 3D scene. In at least one implementation, the scene geometry includes a mesh that models an exterior surface of a simulated object.

The mesh defines an arrangement of object primitives that delineate one or more surface regions mapped onto the exterior surface of the simulated object. In one or more aspects, the object primitives represent polygon shaped representations of the individual surface regions. Attributes of the object primitives are maintained by the mesh as spatiality data corresponding to the surface regions. Non-limiting examples of the attributes, or spatiality data, defined by the object primitives include visibility information (e.g., material properties, color, opacity, normal), positions of vertices and edges, relative placement within a 3D space, relative positioning of two or more primitives within the arrangement, and other information about the surface characteristics and object surface geometries.

Responsive to receiving an input that includes a mesh, the computing device generates a neural representation of the exterior surface modeled by the mesh. The computing device, for instance, produces the neural representation by overfitting the neural representation to the spatiality data and object primitives defined by the mesh. Overfitting the neural representation to the mesh enables the computing device to produce an implicit representation that closely mirrors the geometry and material properties of the simulated object being modeled by the mesh.

Once generated, the neural representation is compatible with various machine-learning tools, including to support manipulation through user interactions. For example, the computing device executes a machine-learning model that is trained to automatically sculpt or otherwise alter the appearance of the object that is modeled by the neural representation. A generative AI model is an example of a machine-learning model that is capable of performing the described techniques for using the neural representation in combination with the mesh as a hybrid object construction for editing the mesh. The hybrid object construction enables the generative AI model to interpret requested modifications from user inputs (e.g., user prompts) and then synchronize automatic alterations made to the neural representation with corresponding updates applied to the mesh to achieve the requested modifications.

In one or more aspects, in response to generating the neural representation of the mesh, the computing device outputs a user interface to preview and receive user inputs for modifying the mesh. The computing device receives a user input, for instance, from an input device, such as a sensor, a camera, a microphone, a touch screen, a stylus, or a mouse. In at least one example, the user input includes a natural language input (e.g., written text, spoken audio, recorded video) that linguistically describes the requested modification. In one or more additional aspects, the same user input or an additional user input includes a selection of the surface regions of the mesh, which indicates a mesh location for applying the requested modification.

The machine-learning model interprets the user input(s) as an indication of a requested modification to one or more surface regions of the mesh. As one example, the machine-learning model is trained using machine-learning techniques to be a generative AI model that interprets the requested modification from a natural language prompt. The natural language prompt and/or additional user inputs are interpreted by the machine-learning model to define one or more surface regions of the exterior surface being modeled by the hybrid object construction, where one or more features are to be automatically changed, added, or removed from the exterior surface. The generative AI model executed by the computing device modifies the neural representation based on the user input and uses the modified neural representation as a guide for similarly modifying the mesh.

The computing device uses the machine-learning model to incrementally update the surface regions of the mesh based on incremental changes applied by the machine-learning model to the neural representation. The generative AI model executes a series of operations or steps, which over time collectively achieve the requested modification within corresponding portions of the exterior surface of the neural representation. Each operation in the series causes an iterative change to the neural representation. With each iterative change to the neural representation, the generative AI model causes a corresponding update to the mesh.

The machine-learning model deploys differential rendering techniques to synchronize changes to the neural representation with updates caused to the mesh. The differential rendering configures the generative AI model to supervise a loss function between the neural representation and the mesh. Over time, the supervised loss function configures the generative AI model to achieve a requested modification that is mirrored in both the neural representation and the mesh.

In response to achieving the requested modification to the mesh based on the hybrid object construction, the computing device outputs the updated mesh for use in rendering or otherwise modeling the simulated object with the requested modification. A render receives the updated mesh, for instance, generates one or more images depicting a realistic view of the simulated object including the requested modification.

Implementation of the described techniques improves efficiency in manipulating (e.g., by sculpting, smoothing, simplifying, or re-subdividing surface regions) object attributes and features represented by a mesh through generative AI modeling that drives automatic updates to the mesh. Hybrid object constructions based on implicit and explicit representations allow object attributes and features defined by a mesh to be automatically synchronized with modifications applied by a machine-learning model to a neural representation of the mesh. A machine-learning model, such as a generative AI model, which is configured to use both implicit and explicit representations overcomes limitations of conventional AI-based modeling techniques. A user maintains control over a final appearance of an object surface through natural language inputs that precisely convey complex or nuanced change requests to user selected regions. A mesh updated using the described techniques is output in a portable data structure (e.g., arrangement of object primitives), which preserves compatibility with conventional mesh modeling tools to allow for further manipulation or efficient rendering. Further discussion of these and other examples and advantages are included in the following sections and shown using corresponding figures.

Term Examples

A "machine-learning model" refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, generative adversarial networks (GANs), decision trees, support vector machines, linear regressions, logistic regressions, Bayesian networks, random forest learning models, dimensionality reduction algorithms, boosting algorithms, deep learning neural networks, and so forth.

A "large language model" (LLM) is a type of machine-learning model that is designed to understand, generate, and interact with human language inputs at a large scale. These machine-learning models are trained on vast amounts of text data using deep learning techniques (e.g., neural networks) to learn patterns, nuances, and the structure of language. The use of the term "large" refers to both the size of the training data and also to the complexity and scale of the neural networks, which may include billions or even trillions of parameters.

Large language models are configurable to perform a wide range of language-related tasks without being explicitly programmed for each one. Examples of these tasks include text generation, translation, summarization, question answering, sentiment analysis, and natural language processing. For example, generative AI models based on large language models are operable to create new digital content, including text, images, music, videos, and other consumable data. Generative AI models learn patterns and structures from existing data and use this knowledge to generate new, similar, or derivative content. To train a generative AI model or other type of large language model, the underlying machine-learning model is provided with training data that includes examples of text to train and retrain the model to predict a next word in a sequence. Over time, the model, once trained, is configured to generate digital content that is coherent and contextually relevant, is configurable to mimic a style and content of the training data, and so forth. In this way, large language models provide a foundational tool in artificial intelligence for understanding and generating human language, powering a wide range of applications from conversational agents to content creation tools.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Scene Construction Environment

FIG. 1 is an illustration of a digital medium environment 100 in an example implementation that is operable to employ techniques described herein for using hybrid object constructions based on implicit and explicit representations. The environment 100 includes a computing device 102, which is configurable in a variety of ways.

The computing device 102, for instance, is configurable as a processing device such as a desktop computer, a laptop computer, a mobile device (e.g., assuming a handheld configuration such as a tablet or mobile phone), and so forth. Thus, the computing device 102 ranges from full resource devices with substantial memory components and processor resources (e.g., personal computers, game consoles) to a low-resource device with limited memory and/or processing resources, e.g., mobile devices. Additionally, although a single computing device 102 is shown, the computing device 102 is also representative of a plurality of different devices (e.g., a computing system), such as multiple servers utilized by a business to perform operations "over the cloud" as described in FIG. 7.

The computing device 102 is illustrated as including a content processing system 104. The content processing system 104 is implemented at least partially in hardware of the computing device 102 to process and transform digital content 106, which is illustrated as being maintained in storage 108 of the computing device 102. Such processing includes creation of the digital content 106, modification of the digital content 106, and rendering or re-rendering of the digital content 106 for presentation in a user interface 110, e.g., for output by a display device 112, for output in other formats (e.g., text based, speech based, video based, sensor based) that are understandable to a user. Although illustrated as implemented locally at the computing device 102, functionality of the content processing system 104 is also configurable in whole or in part through functionality available via the network 114, such as part of a web service or "in the cloud".

Figure 5:
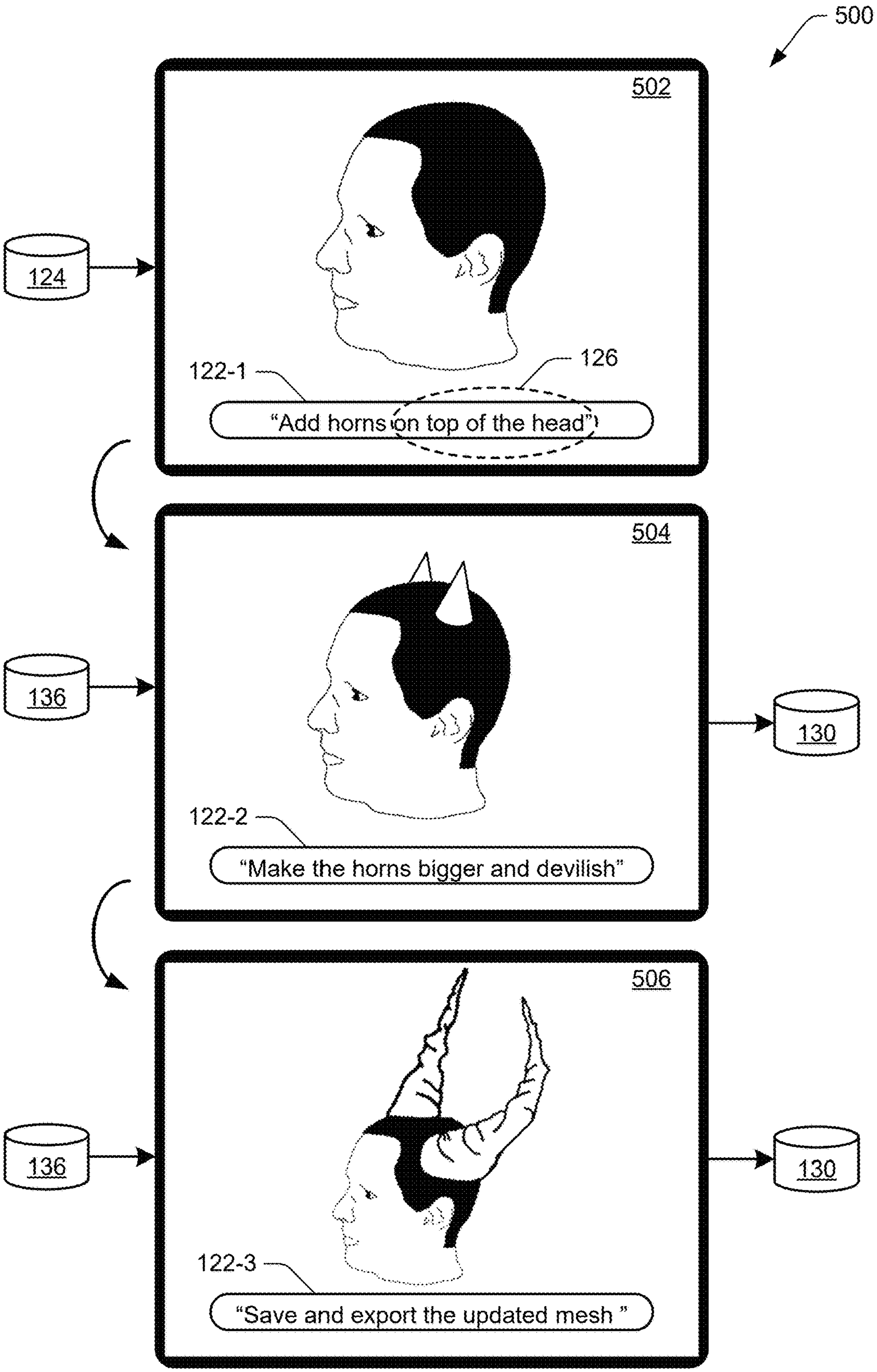
FIG. 5 depicts a sequence of screen shots of a user interface of a content generation module that is operable to employ techniques described herein for using hybrid object constructions based on implicit and explicit representations.

An example of functionality incorporated by the content processing system 104 for processing the digital content 106 is illustrated as a content generation module 116. The content generation module 116 is configured to implement techniques for using hybrid object constructions based on implicit and explicit representations. Through hybrid object construction usage, the content generation module 116 is configured to enable efficient creation of digital content, including to object models used to depict realistic interactions between 3D objects and a simulated environment. The content generation module 116, for instance, implements a 3D modeling tool and the user interface 110 supports users' interactions with the tool for creating and editing 3D models, specifically, explicit representations, such as meshes, that model exterior surfaces or volumes of simulated 3D objects. A working example of a user interacting with the user interface 110 to use the 3D modeling tool implemented by the content generation module 116 is depicted in FIG. 5.

The inputs to the content generation module 116 are included in an input 118 received by the content generation module 116. The input 118 includes a user prompt 122, an original mesh 124 (or other type of explicit representation that models a simulated object), and a region selection 126. In the illustrated example, based on the input 118 received by the content generation module 116, the user interface 110 displays the original mesh 124 to support mesh editing features of the 3D modeling tool. The user prompt 122 and the region selection 126 are used in combination by the content generation module 116 to enable a machine-learning based editing features of the 3D modeling tool, which automatically change the way the original mesh 124 models or defines the various surface regions that make up the exterior surface or volume of a simulated object.

In at least one implementation, the user prompt 122 includes a natural language input that linguistically describes a requested modification 132 to be applied by the content generation module 116 the original mesh 124. The natural language input includes, for instance, a text prompt, a voice prompt, or a video prompt conveying the requested modification 132. As one example, the requested modification 132 a request to sculpt a physical feature modeled for the simulated object. As illustrated, the requested modification 132 represents a requested sculpting of horns from the top of a model of a human head. As another example, the requested modification 132 includes a request to alter a physical feature of the simulated object including to add, remove, or change how the exterior surface is modeled by the original mesh 124. The computing device receives the user prompt 122, for instance, from an input device coupled to the computing device 102, such as a sensor, a camera, a microphone, a touch screen, a stylus, or a mouse. In at least one example, the user prompt 122 linguistically describes the requested modification 132 as well as linguistically describing the region selection 126.

Whether included in the user prompt 122 or received as a separate input to the user interface 110, the region selection 126 represents a user input registered by the user interface 110 for localizing the requested modification 132 performed by the content generation module 116 to a particular area of the original mesh 124. For example, a user input received at the user interface 110 is depicted in FIG. 1 using ovals to highlight the region selection 126 as encompassing multiple surface regions of the original mesh 124. The region selection 126 indicates to the content generation module 116 specific mesh locations (e.g., surface regions) of the original mesh 124 that fall within a scope of the requested modification 132. The region selection 126 facilitates the content generation module 116 in preserving an original appearance of a simulated object within the remaining parts of the original mesh 124, which are outside the scope of the requested modification 132.

The original mesh 124 is an example of an explicit representation that models the exterior surface of a simulated object based on an arrangement of object primitives that delineate surface regions mapped onto an exterior surface of the simulated object. In at least one example, the original mesh 124 defines numerous object primitives (e.g., polygons, triangles), which represent individual surface regions of an object's exterior surface. Each of the object primitives, for instance, defines one or more attributes of a corresponding surface region. As multiple non-limiting examples, the attributes of the corresponding surface region include one or more of visibility information of the corresponding surface region (e.g., a color, an opacity, a normal), a polygon type of the corresponding surface region, a shape of the corresponding surface region, a size of the corresponding surface region, positions of vertices and edges of the corresponding surface region, relative placement of the corresponding surface region within a 3D space, and relative positioning of the corresponding surface region and at least one other surface region within the arrangement, and other information about the surface characteristics and object surface geometries.

The outputs from the content generation module 116 are included in an output 120 generated in response to the input

118. The output 120 includes rendered images 128, and an updated mesh 130, or other same or similar type of explicit representation as the original mesh 124. In the illustrated example, based on the input 118 received by the content generation module 116, the user interface 110 displays the rendered images 128 to facilitate user creation of the digital content 106, such as for viewing different perspectives of the simulated object that is modeled by the updated mesh 130, and evaluating a final appearance of the requested modification 132. The updated mesh 130 is output from the content generation module 116 to be used by downstream modeling processes performed with the content generation module 116, or other modeling tools executing on or accessible to the content processing system 104. For example, the updated mesh 130 is a self-contained data structure (e.g., data file) that is storable on the computing device 102, sharable through transmission among computing resources communicating across the network 114. In one or more aspects, the updated mesh 130 represents an input to a simulation tool that renders the updated mesh 130 to generate real-time updates to views of a simulated environment.

The output 120 is generated based on the input 118 using hybrid object constructions maintained by the content generation module 116, which are based on implicit and explicit representations of the surface regions defined by the original mesh 124. As depicted, the digital content 106 generated by the content generation module 116 includes a neural representation 134 and at least one iterative mesh 136. The neural representation 134 is an example of an implicit representation maintained by the content generation module 116, and the iterative mesh 136 is an example of an explicit representation maintained during the digital content 106 generation process. The content generation module 116 executes or accesses a machine-learning model that iteratively updates the neural representation 134 and the iterative mesh 136 to achieve the requested modification 132 conveyed in the updated mesh 130. In one or more aspects, the user interface 110 displays the iterative mesh 136 as including an iterative modification 138 caused to the original mesh 124 over a series of modification steps performed by the machine-learning model to achieve the requested modification 132.

Responsive to receiving the input 118, the machine-learning model (or other part of the content generation module 116) creates the neural representation 134 as an alternate model of the exterior surface of the object simulated by the original mesh 124. In one or more examples, the iterative mesh 136 is created as a duplicate copy of the original mesh 124. In an alternative implementation, the original mesh 124 is used as the iterative mesh 136 being manipulated by the machine-learning model in conjunction with the neural representation 134 to generate the updated mesh 130.

The neural representation 134 overfits the information (e.g., the spatiality data and object primitives) contained in the original mesh 124 to enable efficient rendering of one or more of the rendered images 128. Overfitting the neural representation 134 to the original mesh 124 enables the content generation module 116 to produce an implicit representation that closely mirrors the geometry and material properties of the simulated object being modeled by the original mesh 124. Non-limiting examples of the neural representation 134 include a signed distance function (SDF), a neural radiance field (NeRF), a neural network, or other type of machine-learned model configured to represent the geometry and attributes of the exterior surface modeled by the original mesh 124. As a signed distance function, the neural representation 134 embeds the shortest distance from any given point in space to the closest point on the exterior surface modeled by the original mesh 124. For example, the shortest distance is a positive value if the closest point is outside the exterior surface modeled by the original mesh 124, a zero value if the closest point is on the exterior surface, and a negative value if the closest point is inside the exterior surface modeled by the original mesh 124. Once generated, the neural representation 134 is compatible with various machine-learning features implemented by the content generation module 116, including generative AI techniques performed to achieve the requested modification 132.

A generative AI model is an example of a machine-learning model used by the content generation module 116, which is capable of performing the described techniques for using the neural representation 134 in combination with the updated mesh 130 as a hybrid object construction for editing the original mesh 124. The generative AI model, for instance, interprets the requested modification 132 from the natural language input inferred from the user prompt 122 and the surface regions selected based on the region selection 126.

The hybrid object construction enables the generative AI model to achieve the requested modification 132 in an iterative fashion by synchronizing automatic alterations made to the neural representation 134 with corresponding updates applied to the iterative mesh 136. The generative AI model is trained to update the surface regions of the iterative mesh 136 based on incremental changes applied by the generative AI model to the neural representation 134. In at least one example, the generative AI model is trained to perform a series of sculpting or other alterations to the neural representation 134, which over time, enable by the generative AI model to mirror the requested modification 132 in the implicit representation. At each iteration, the generative AI model uses the neural representation 134 as a guide for similarly modifying the explicit representation represented by the iterative mesh 136. The generative AI model executes a series of operations or steps, which over time collectively achieve the requested modification 132 within corresponding portions of the exterior surface of the neural representation 134. Each operation in the series causes an iterative change to the neural representation 134. With each iterative change to the neural representation 134, the generative AI model causes a corresponding update (e.g., the iterative modification 138) to the iterative mesh 136.

In one or more aspects, the content generation module 116 deploys differential rendering techniques to synchronize changes to the neural representation 134 with each iterative modification 138 caused to the iterative mesh 136. The differential rendering configures the content generation module 116 to supervise a loss function of the generative AI model, to reduce differences in rendering capabilities between the neural representation 134 and the iterative mesh 136. Over time, the supervised loss function configures the generative AI model to achieve the requested modification 132 that is mirrored in both the neural representation 134 and the iterative mesh 136.

Implementation of the described techniques improves efficiency in manipulating (e.g., by sculpting, smoothing, simplifying, or re-subdividing surface regions) object attributes and features represented by the original mesh 124, through generative AI modeling that drives automatic creation of the updated mesh 130. A user of the content generation module 116 maintains control over a final appearance of an object surface through natural language inputs that precisely convey complex or nuanced change requests to user selected regions. The updated mesh 130 created using the described techniques is output in a portable data structure (e.g., arrangement of object primitives), which preserves compatibility with conventional mesh modeling tools to allow for further manipulation or efficient rendering.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Architecture for Using Hybrid Object Constructions

The following discussion describes hybrid object construction techniques that are based on implicit and explicit representations, and implementable utilizing the previously described systems and devices. Aspects of each of the procedures are implemented in hardware, firmware, software, or a combination thereof. The procedures are shown as a set of blocks that specify operations performed by one or more devices and are not limited to the orders shown for performing the operations by the respective blocks.

Figure 2:
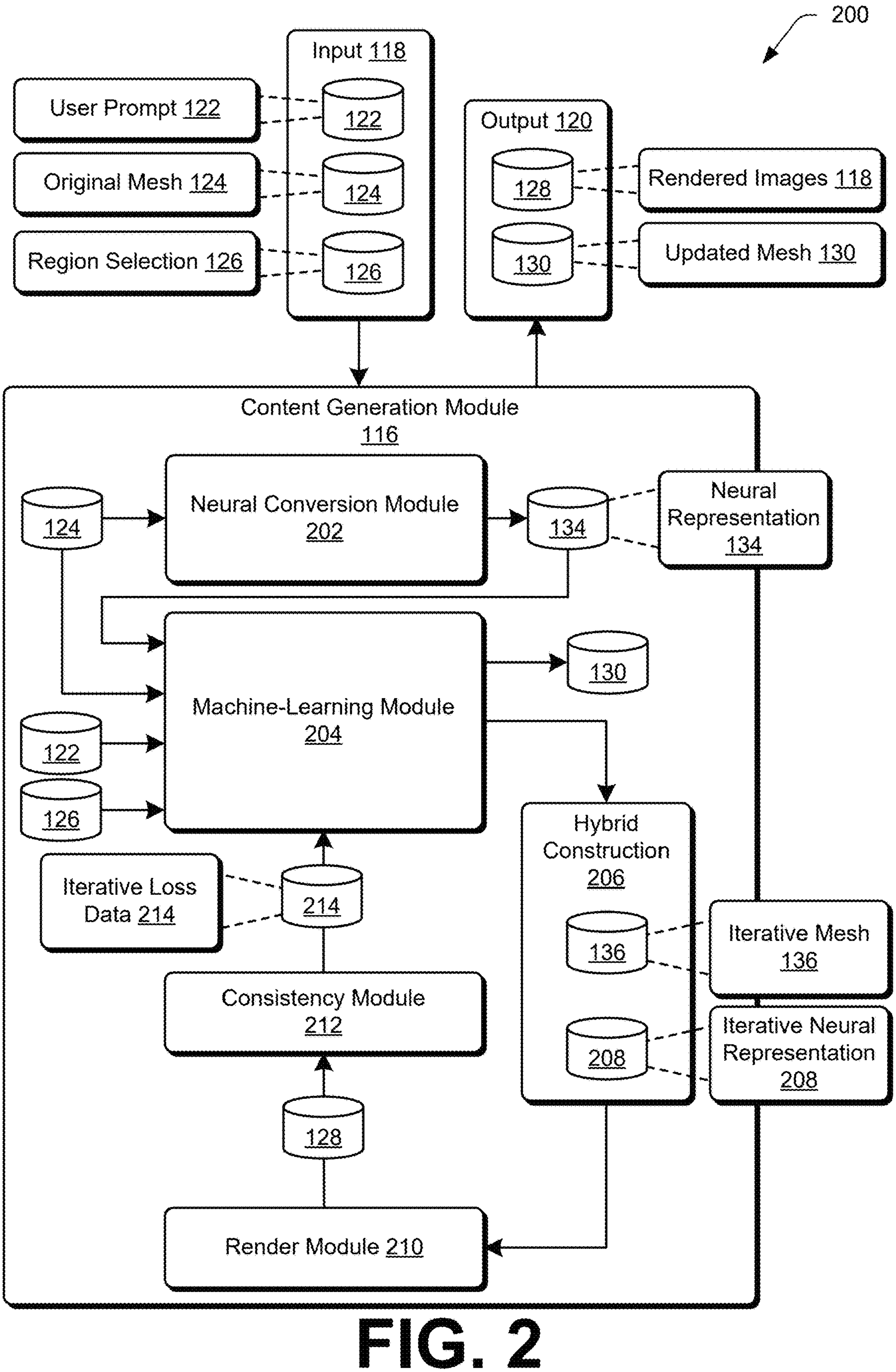
FIG. 2 is a block diagram of a system as an example implementation of a content generation module that is operable to employ techniques described herein for using hybrid object constructions based on implicit and explicit representations.

FIG. 2 depicts a system 200 as an example implementation of the content generation module 116 depicted in FIG. 1, which is operable to employ techniques described herein for using hybrid object constructions based on implicit and explicit representations. Generally, the system 200 is operable to construct the neural representation 134 and the iterative mesh 136 to output the updated mesh 130 and convey the requested modification 132 as being applied to the original mesh 124.

As shown in FIG. 2, the content generation module 116 includes a neural conversion module 202 and a machine-learning module 204. In one or more aspects, the neural conversion module 202 is implemented within the machine-learning module 204. In other examples, the neural conversion module 202 is a stand-alone feature of the content generation module 116, which is separate from the machine-learning module 204.

The neural conversion module 202 receives the original mesh 124 as an input, and outputs the neural representation 134. For example, the neural conversion module 202 performs operations that convert information derived from object primitives defined by the original mesh 124 into signed distance values embedded within a signed distance function that is output as the neural representation 134. In one or more examples, the neural conversion module 202 generates the neural representation 134 based on overfitting the neural representation 134 to object primitives defined by the original mesh 124. The neural representation 134 is a signed distance field type neural representation in at least one example and is a neural field-based representation in at least one other example. Although the neural conversion module 202 is depicted as receiving the original mesh 124 as an input, in one or more implementations, the neural representation 134 is generated from an original source other than the original mesh 124. As one example, the neural representation 134 and the original mesh 124 are independently generated based on a common definition of geometry obtained for defining an exterior surface of a common object. The neural conversion module 202 generates the neural representation 134 based on the common definition to mirror the surface regions defined by the original mesh 124.

The machine-learning module 204 includes one or multiple machine-learning models configured to perform two main functions of the content generation module 116. At least one machine-learning model is executed to support a generative AI interface for receiving the input 118 and interpreting the requested modification 132 based on the user prompt 122 and the region selection 126. In addition, the same or a different machine-learning model is executed by the machine-learning module 204 to manage a hybrid construction 206 created to facilitate efficient modifications to the neural representation 134, which are in lockstep with modifications to the iterative mesh 136. The machine-learning module 204 interprets the requested modification 132 using at least one machine-learning model. Then, using the same or different machine-learning model, the machine-learning module 204 achieves the requested modification 132 within the updated mesh 130. In one or more examples, the updated mesh 130 is output from the machine-learning module 204 and provided in the output 120.

The hybrid construction 206 includes an implicit representation and an explicit representation that each model a simulated object as the machine-learning module 204 achieves the requested modification 132.

The hybrid construction 206 combines the benefits of a signed distance function or other neural representation and meshes together into a single object construction. For example, signed distance functions are more robust to noisy gradients and meshes allow for accurate computation of surface-based losses and to achieve localization of edits. Both the implicit and explicit representations are kept consistent by the machine-learning module 204 in cooperation with other components of the content generation module 116, e.g., via multi-view consistency losses and adaptive remeshing.

In the illustrated example, the hybrid construction 206 includes the iterative mesh 136, as well as an iterative neural representation 208. In at least one example, the iterative neural representation 208 starts out as the neural representation 134 or a duplicate copy of the neural representation 134. For achieving the requested modification 132 in an iterative manner, the machine-learning module 204 mirrors iterative changes applied to the iterative neural representation 208 with corresponding changes applied to the iterative mesh 136. For example, the machine-learning module 204 incrementally updates the surface regions of the iterative mesh 136 by incrementally modifying one or more attributes defined by the object primitives in the iterative mesh 136 to mirror an incremental change applied to the corresponding portions of the iterative neural representation 208.

The content generation module 116 further includes a render module 210 and a consistency module 212. The render module 210 generates the rendered images 128 created from rendering the hybrid construction 206. The consistency module 212 performs differential rendering techniques based on the rendered images 128 received from the render module 210, for instance, to perform backpropagation of iterative loss data 214 usable to supervise a loss function of the machine-learning module 204 in generating the hybrid construction 206. The rendered images 128, for example, include a set of neural renderings generated to depict views of the iterative neural representation 208 in a simulated environment. The rendered images 128 also include a set of mesh renderings generated to convey similar views of the simulated environment based on the iterative mesh 136. The consistency module 212 identifies differences between the neural renderings and the mesh renderings received in the rendered images 128. The differences are output as the iterative loss data 214 for use in supervising a loss function of the machine-learning module 204. By modifying the hybrid construction 206 in an iterative manner using differential rendering, and backpropagation of the iterative loss data 214, care is taken by the machine-learning module 204 to preserve as much of the original mesh 124 as possible in achieving the updated mesh 130.

In the illustrated example, the machine-learning models of the machine-learning module 204 are configured using a plurality of layers including, respectively, a plurality of nodes. The plurality of layers are configurable to include an input layer, an output layer, and one or more hidden layers. Calculations are performed by the nodes within the layers via hidden states through a system of weighted connections that are "learned" during training and retraining of the machine-learning models to implement a variety of tasks.

To train the machine-learning models of the machine-learning module 204, training data is received to provide examples of "what is to be learned" by each machine-learning model, i.e., as a basis to learn patterns from the training data, and include input features and corresponding target labels, i.e., of what is exhibited by the input features. The machine-learning module 204 initializes parameters of the machine-learning models, which are used as internal variables to represent and process information during training and represent inferences gained through training. In an implementation, the training data for the machine-learning module 204 is separated into batches to improve processing and optimization efficiency of the parameters during training.

A portion of the training data is then received as an input by each machine-learning model. Each portion of the training data is used as a basis for generating predictions based on a current state of parameters of layers and corresponding nodes, a result of which is output as output data. Output data describes an outcome of the task, e.g., as a probability of being a member of a particular class in a classification scenario.

Training of each machine-learning model described herein includes calculating a loss function to quantify a loss associated with operations performed by nodes of the neural representations. The calculating of the loss function, for instance, includes implementing functions for comparing a difference between predictions specified in the output data from each machine-learning model with target labels specified by the training data. In one or more aspects, the consistency module 212 outputs iterative loss data 214 based on analysis of the rendered images 128 to cause consistency between how the iterative mesh 136 models the exterior surface of a simulated object and how the iterative neural representation 208 models the simulated object. The loss function is configurable in a variety of ways, examples of which include regret, Quadratic loss function as part of a least squares technique, and so forth.

Calculation of the loss function also includes use a backpropagation operation enabled by the render module 210 and the consistency module 212, for example, as part of minimizing the loss function and thereby training parameters of each machine-learning model adopted by the machine-learning module 204. Based on the iterative loss data 214, the machine-learning module 204 is operable to minimizing the loss function, for instance, by adjusting weights of the nodes to minimize the loss and thereby optimize performance of each machine-learning model in performance of respective tasks. The adjustment is determined by computing a gradient of the loss function, which indicates a direction to be used to adjust the parameters to minimize the loss. The parameters of each machine-learning model are then updated based on the computed gradient.

In an example, this process continues over a plurality of iterations until each machine-learning module 204 determines that a stopping criterion is met. The stopping criterion employed by the machine-learning models of the machine-learning module 204 in this example is selected to promote mirroring of alterations made to the iterative mesh 136 and the iterative neural representation 208, reduce computational resource consumption, and/or promote an ability of the machine-learning module 204 to address previously unseen data, i.e., information that is not actually included as an example in the training data. Examples of a stopping criterion include but are not limited to a predefined number of epochs, validation loss stabilization, achievement of a performance improvement threshold, or based on performance metrics such as precision and recall. As one example, the stopping criterion of the machine-learning module 204 is based on achieving the requested modification 132 within the updated mesh 130.

Figure 3:
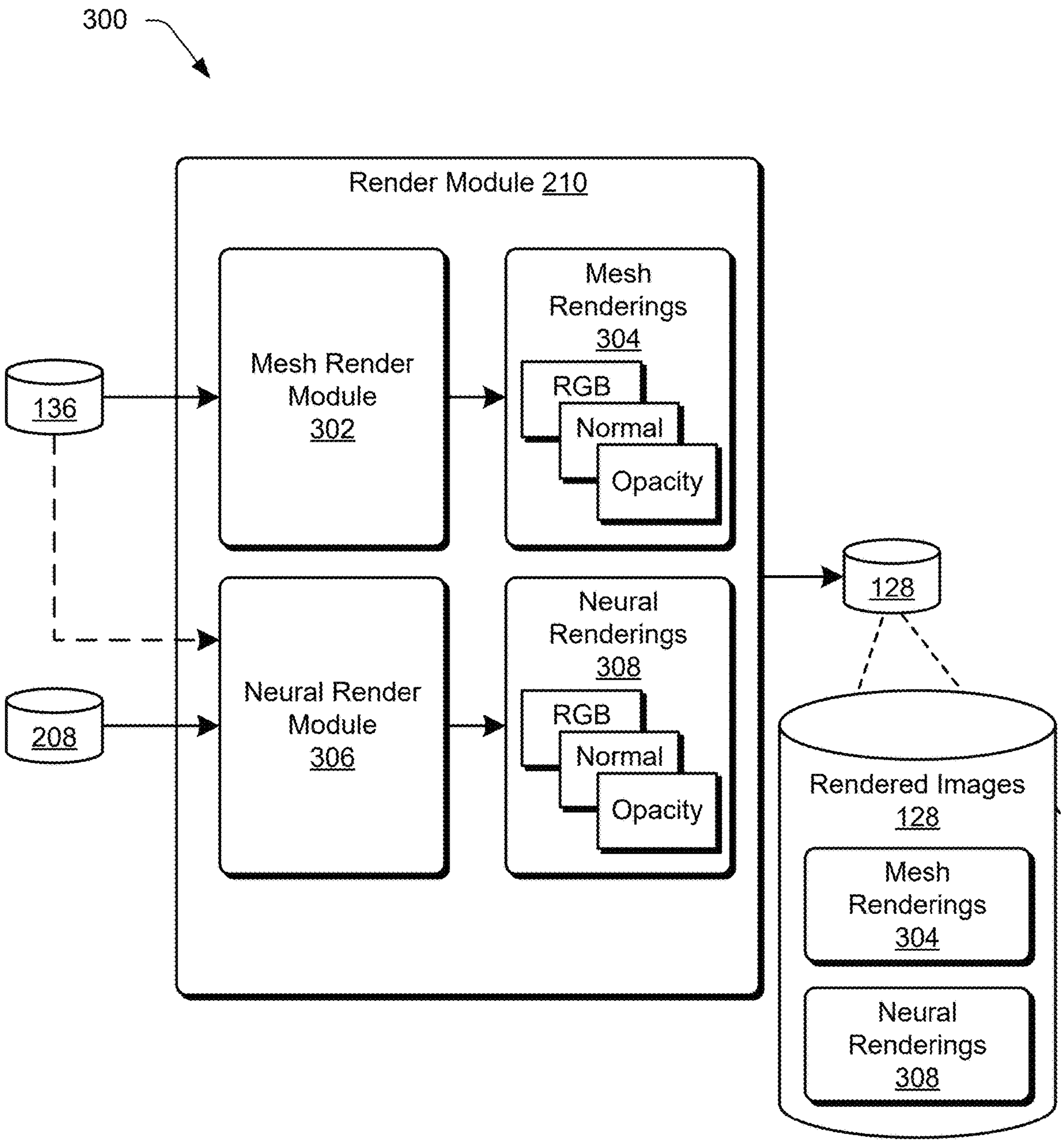
FIG. 3 is a block diagram of a render module used in the content generation module of the example implementation depicted in FIG. 2.

FIG. 3 is a block diagram 300 of the render module 210 used in the content generation module 116 of the example implementation depicted in FIG. 2. The render module 210 receives the iterative mesh 136 and the iterative neural representation 208 as inputs, and outputs the rendered images 128 in response to the inputs.

In the illustrated example, the render module 210 implements two separate rendering pipelines. A first rendering pipeline includes a mesh render module 302 to performs rasterization, shading, and other rendering techniques on the iterative mesh 136. The mesh render module 302 outputs one or more mesh renderings 304 included in the rendered images 128. In the illustrated example, the mesh renderings 304 include different types of rendered images, including a color pixel map of red, green, blue (RGB) pixel values, a normal map of normal values, and an opacity map of opacity values. A second rendering pipeline includes a neural render module 306 to performs rasterization, shading, and other rendering techniques on the iterative neural representation 208. The neural render module 306 is configured to output one or more neural renderings 308 included in the rendered images 128. For example, the neural renderings 308 also include different types of rendered images, including a color pixel map of RGB pixel values, a normal map of normal values, and an opacity map of opacity values.

In one or more examples, the mesh render module 302 and the neural render module 306 are configured to generate the rendered images 128 to be comparable by the consistency module 212. The mesh renderings 304 and the neural renderings 308, for instance, each depict similar views of the simulated object, under similar conditions and in a same 3D space.

The render module 210 is configured to generate the mesh renderings 304 and the neural renderings 308 to facilitate the consistency module 212 and the machine-learning module 204 in keeping the explicit and implicit representations of the hybrid construction 206 synced, efficiently. To achieve this, the render module 210, in one or more aspects, differentially renders both the iterative mesh 136 and the iterative neural representation 208 from various angles, including to achieve consistency in RGB, opacity and normal maps. In one or more examples, the iterative mesh 136 is optionally used to improve efficiency and speed of the neural render module 306 when rendering the iterative neural representation 208, including to achieve high resolution in the neural renderings 308. For example, instead of performing ray tracing based on hundreds (e.g., 512) of samples per ray to render the iterative neural representation 208, the neural render module 306 relies on the iterative mesh 136 to be a guide for localizing the sampling of the implicit neural representation 208 around the exterior surface, using, in one or more implementations, as few as three samples.

Figure 4:
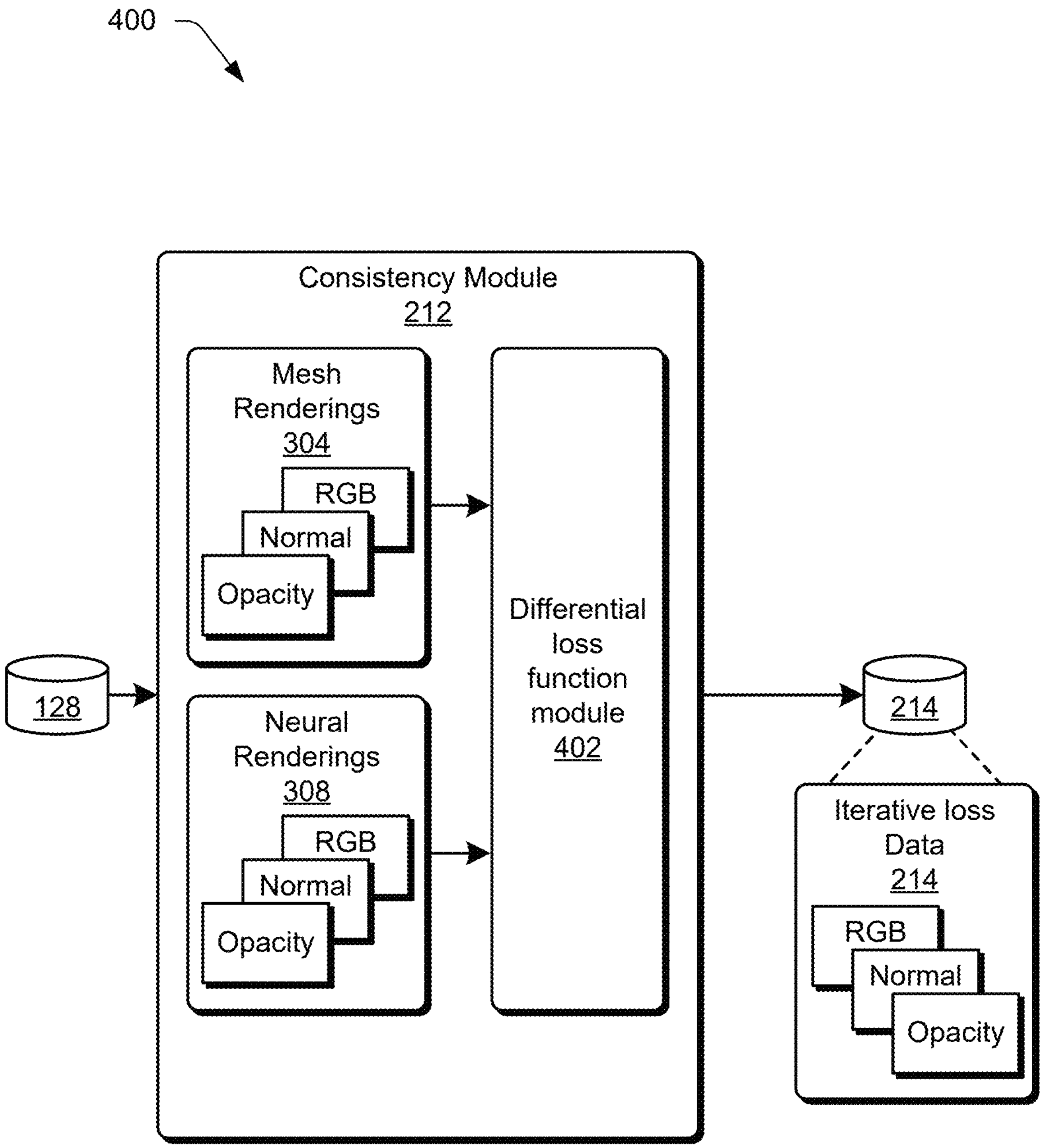
FIG. 4 is a block diagram of a consistency module used in the content generation module of the example implementation depicted in FIG. 2.

FIG. 4 is a block diagram 400 of the consistency module 212 used in the content generation module 116 of the example implementation depicted in FIG. 2. The consistency module 212 receives the rendered images 128 as inputs, and outputs the iterative loss data 214 in response to the inputs.

In the illustrated example, the consistency module 212 includes a differential loss function module 402. The differential loss function module 402 receives the mesh renderings 304 as one input and compares the mesh renderings 304 to the neural renderings 308 received as a second input. The differential loss function module 402 performs gradient calculations with respect to the mesh renderings 304 and the neural renderings 308. These gradients are used for optimization tasks performed by the machine-learning module 204 to enable the adjustment of the hybrid construction 206 and improve how the iterative mesh 136 and the iterative neural representation 208 model 3D object parameters to minimize a loss function.

The loss function, for example, measures the difference between the mesh renderings 304 and the neural renderings 308. By outputting the iterative loss data 214 indicative of these differences, the consistency module 212 enables the machine-learning module 204 to minimize this loss and adjust the hybrid construction 206 to improve consistency in the implicit and explicit representations.

The gradients calculated by the consistency module 212 are propagated within the iterative loss data 214 back through the machine-learned model(s) of the machine-learning module 204. This backpropagation process causes updates by the machine-learning module 204 to one or more of parameters of the machine-learning modules for improving accuracy of the iterative mesh 136 in mirroring the iterative neural representation 208 towards achieving the requested modification 132 in the updated mesh 130.

The differential rendering and loss supervision performed by the render module 210 and the consistency module 212, enables the machine-learning module 204 to incrementally update the surface regions of the iterative mesh 136 by synchronizing each incremental update to the iterative mesh 136 with a corresponding incremental change applied to the iterative neural representation 208. The machine-learning module 204 is configured to use differentiable rendering for supervising a loss function that compares the mesh renderings 304 of the iterative mesh 136 to the neural renderings 308 of the iterative neural representation 208.

FIG. 5 depicts a sequence 500 of screen shots of a user interface of the content generation module 116, which is operable to employ techniques described herein for using hybrid object constructions based on implicit and explicit representations. For example, screen shots 502 through 506 are examples screen shots of the user interface 110 displayed by the computing device 102 as a user interacts with the 3D modeling tool implemented by the content generation module 116.

In the illustrated example, the 3D modeling tool implemented by the user interface 110 allows a user of the content generation module 116 to manipulate meshes and render images from the meshes. Picture a situation where the user is a game developer interacting with the user interface 110 to design a character modeled by the original mesh 124. To support a storyline for a game, the user interacts with the content generation module 116 to apply a pair of horns protruding from the top of the character's head. However, manually sculpting the original mesh 124 to have realistic looking horns at the selected mesh locations is tedious.

As depicted in a screen shot 502, the user interface 110 displays a 3D view of the original mesh 124 as the user interface 110 also receives a user prompt 122-1. The user prompt 122-1 includes text that states "add horns on top of the head". In response to the user prompt 122-1, the machine-learning module 204 determines the requested modification 132 to be for adding horns to a head, and also infers from the user prompt 122-1 that the region selection 126 includes surface regions that model an exterior surface associated with the top of the head. The content generation module 116 performs hybrid object construction techniques to generate the updated mesh 130 as having the requested modification 132.

Next, a screen shot 504 of the user interface 110 depicts a 3D view of the updated mesh 130, which has been modified by the machine-learning module 204 to model the head as having short horns sculpted on the surface of the head. Unsatisfied with the result, the user inputs another user prompt 122-2 for commanding the content generation module 116 to "make the horns bigger and devilish". In response to the user prompt 122-2, the machine-learning module 204 determines the requested modification 132 to be for enlarging the horns sculpted on the head and adding design features (e.g., texture) that cause the horns to appear demonic. The content generation module 116 performs additional hybrid object construction techniques to re-generate the updated mesh 130 as having the requested modification 132 defined by the user prompt 122-2.

The user may interact with the user interface 110 over one or more iterations to achieve the desired design of the updated mesh 130. A screen shot 506 of the user interface 110 depicts a 3D view of the updated mesh 130, which has been modified by the machine-learning module 204 to model the head as having larger and more devilish horns being sculpted on the surface of the head. Once the character design is complete, the user inputs a final user prompt 122-3 to cause the content generation module 116 to output the updated mesh 130. For example, the final user prompt 122-3 includes text that states "save and export the updated mesh." In response to the final user prompt 122-3, the updated mesh 130 is included in the output 120.

The user prompt interface enabled by the machine-learning module 204 allows the user to cause edits to the original mesh 124, quickly and intuitively, without having to provide tedious inputs to manually sculpt or otherwise redesign the original mesh 124. The hybrid object construction techniques based on implicit and explicit representations ensure the requested modification 132 is achieved with high-quality and consistency between the updated mesh 130 and the regions of the original mesh 124 that are outside the scope of the requested modification 132.

FIG. 6 is a flow diagram depicting an algorithm as a step-by-step procedure 600, which is performable by a processing device to use hybrid object constructions based on implicit and explicit representations. The procedure 600 is executed by the content generation module 116 to produce the updated mesh 130 for achieving the requested modification 132 to the original mesh 124.

At the start of the procedure 600, a mesh that models an exterior surface of a simulated object is obtained (block 602). For example, the content generation module 116 receives the original mesh 124 from the input 118.

Next in the procedure 600, a neural representation of the exterior surface is generated (block 604). The neural conversion module 202, for instance, generates the neural representation 134 by converting the object primitives and other geometry data defined by the original mesh 124 into information embedded in a signed distance function.

The procedure 600 continues by receiving a user input that indicates a requested modification to one or more surface regions of the mesh (block 606). In one or more aspects, the user prompt 122 and the region selection 126 are received from the user interface 110. The machine-learning module 204 infers the requested modification 132 including the surface regions of the original mesh 124 that are in the scope of the requested modification 132.

Next in the procedure 600, a machine-learning model is used to incrementally update the surface regions of the mesh based on incremental changes applied by the machine-learning model to the neural representation for achieving the requested modification within corresponding portions of the exterior surface of the neural representation (block 608). In at least one example, a machine-learning model of the machine-learning module 204 generates the hybrid construction 206 over several iterations to achieve the requested modification 132 on both the iterative neural representation 208 and the iterative mesh 136. The render module 210 and the consistency module 212 supervise the iterative updates to the hybrid construction 206 using differential rendering techniques that cause the machine-learning module 204 to converge on similar updates being applied to both the iterative neural representation 208 and the iterative mesh 136. Optionally, this step is repeated based on additional user inputs (e.g., additional user prompts and region selections) to facilitate a final design.

The procedure 600 concludes by outputting the updated mesh for use in rendering the simulated object with the requested modification (block 610). For example, the updated mesh 130 is included in the output 120. Other modeling or production tools (e.g., implemented by the content processing system 104 and/or by other computing resources that are in communication over the network 114 with the content processing system 104) receive the updated mesh 130 for performing additional modeling and production functions based on the updated mesh 130.

Example System and Device

Figure 7:
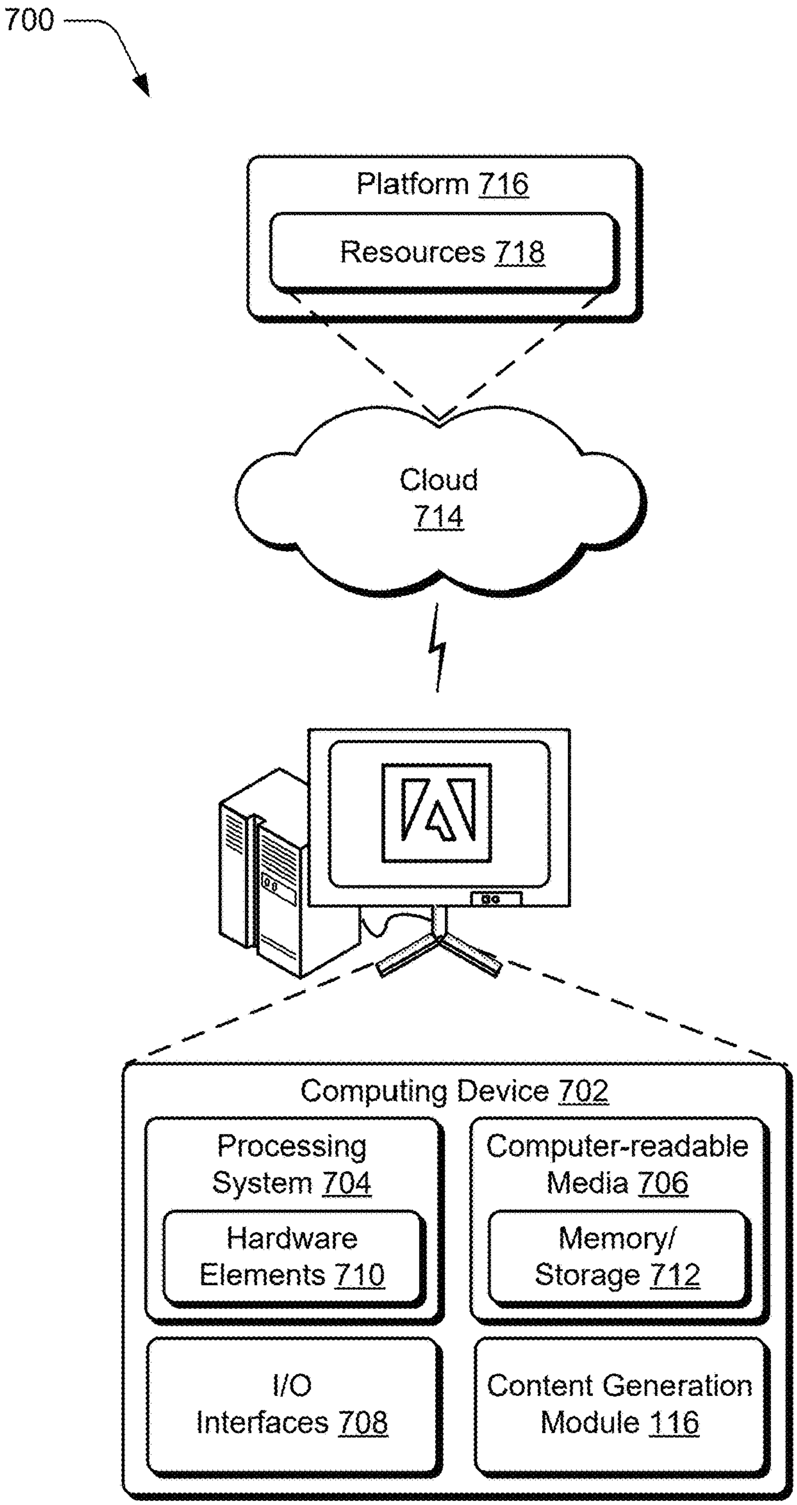
FIG. 7 illustrates an example system including various components of an example device usable as any type of computing device as described and/or utilized with reference to FIGS. 1-6 to implement examples of the techniques described herein.

FIG. 7 illustrates an example system 700 including various components of an example device usable as any type of computing device as described and/or utilized with reference to FIGS. 1-6 to implement examples of the techniques described herein. FIG. 7 illustrates an example system 700 generally, which includes an example computing device 702 that is representative of one or more computing systems and/or devices that implement the various techniques described herein. This is illustrated through inclusion of the content generation module 116. The computing device 702 is configurable, for instance, as a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 further includes a system bus or other data and command transfer system that couples the various components, one to another. In one or more examples, a system bus includes a single bus structure, or combination, of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including the hardware elements 710, which are configurable as processors, functional blocks, and so forth. This includes implementation in hardware as an application specific integrated circuit or other logic device formed using one or more semiconductors. The hardware elements 710 are not limited by the materials that form the hardware elements 710, or the processing mechanisms employed therein. For example, processors are configurable as semiconductor(s) and/or transistors, e.g., electronic integrated circuits (ICs). In such a context, processor-executable instructions are electronically executable instructions.

The computer-readable media 706 is storage media illustrated as including memory/storage 712. The memory/storage 712 represents memory/storage capacity associated with one or more computer-readable media. The memory/storage 712 is configured as a memory component, for example, which is configured to store the hybrid construction 206 and/or the updated mesh 130. The memory/storage 712 includes volatile media (such as random access memory (RAM)) and/or nonvolatile media, such as read-only memory (ROM), Flash memory, optical disks, magnetic disks, and so forth. The memory/storage 712 includes fixed media (e.g., RAM, ROM, a fixed hard drive, and so on) as well as removable media, e.g., Flash memory, a removable hard drive, an optical disc, and so forth. The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways to support user interaction, as described herein.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms and for a variety of processors.

An implementation of the described modules and techniques is stored on or transmitted across some form of computer-readable media. The computer-readable media includes a variety of media that is accessed by the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable, and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of signal characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that are employed in some examples to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously. For example, the hardware elements 710 include a processing device coupled to the memory component implemented by the memory/storage 712 to perform operations of the content generation module 116. The operations, when executed, cause the processing device implemented by the hardware elements 710 to generate the updated mesh 130 stored in the memory/storage 712, including for modeling a simulated object defined by the updated mesh 130.

Combinations of the foregoing are also employed to implement various techniques described herein. Accordingly, software, hardware, or executable modules are implemented as one or more instructions and/or logic embodied on some form of computer-readable storage media and/or by one or more hardware elements 710. The computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (e.g., at least one computing device 702 and/or processing systems 704) to implement techniques, modules, and examples described herein.

The techniques described herein are supported by various configurations of the computing device 702 and are not limited to the specific examples of the techniques described herein. This functionality is also implementable or partially implementable through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data utilized while computer processing is executed on servers that are remote from the computing device 702. In at least one example, the resources 718 include services provided over the Internet and/or through a subscriber network, such as a cellular or Wi-Fi network.

The platform 716 abstracts resources and functions to connect the computing device 702 with other computing devices. The platform 716 also serves to abstract scaling of resources to provide a corresponding level of scale to encountered demand for the resources 718 that are implemented via the platform 716. Accordingly, in an interconnected device example, implementation of functionality described herein is distributable throughout the system 700. The functionality is implementable in part on the computing device 702 as well as via the platform 716 that abstracts the functionality of the cloud 714.

Although the techniques have been described in language specific to structural features and/or methodological acts, it is to be understood that the techniques defined in the appended claims are not limited to the specific features or acts described. Rather, the specific features and acts are disclosed as example forms of implementing the claims.

What is claimed is:

1. A method comprising:

obtaining, by a processing device, a mesh that models an exterior surface of a simulated object;

generating, by the processing device, a neural representation of the exterior surface;

receiving, by the processing device, a user input that indicates a requested modification to one or more surface regions of the mesh;

incrementally updating, by the processing device using a machine-learning model, the surface regions of the mesh based on incremental changes applied by the machine-learning model to the neural representation for achieving the requested modification within corresponding portions of the exterior surface of the neural representation; and outputting, by the processing device, the updated mesh for use in rendering the simulated object with the requested modification.

2. The method of claim 1, wherein the neural representation is generated based on overfitting the neural representation based on to spatiality data and object primitives defined by the mesh that produces an implicit representation to mirror geometry and material properties of the simulated object being modeled by the mesh.

3. The method of claim 1, wherein the neural representation includes at least one of:

a neural field-based representation; or a signed distance field type neural representation that embeds a shortest distance from a given point in space to a closest point on the exterior surface modeled by the mesh.

4. The method of claim 1, wherein the neural representation and the mesh are independently generated based on a common definition of geometry obtained for defining the exterior surface of the simulated object.

5. The method of claim 1, wherein the user input includes a selection of the surface regions of the mesh that indicates a mesh location for applying the requested modification.

6. The method of claim 1, wherein:

the user input includes a natural language input that linguistically describes the requested modification; and the machine-learning model includes a generative AI model that interprets the requested modification from the natural language input and modifies the neural representation based on the natural language input.

7. The method of claim 6, wherein the natural language input includes a text prompt or a voice prompt.

8. The method of claim 1, wherein the requested modification includes a request to sculpt a particular feature of the simulated object.

9. The method of claim 1, wherein the requested modification includes a request to alter a particular feature of the simulated object including to add, remove, or change the particular feature.

10. A system comprising:

a memory component configured to store a mesh that models an exterior surface of a simulated object, and a neural representation of the exterior surface; and a processing device coupled to the memory component to perform operations that cause a requested modification to one or more surface regions of the mesh based on user input by:

using a machine-learning model to incrementally update the surface regions of the mesh based on incremental changes applied by the machine-learning model to the neural representation for achieving the requested modification within corresponding portions of the exterior surface of the neural representation; and outputting the mesh for use in rendering the simulated object with the requested modification.

11. The system of claim 10, wherein the mesh models the exterior surface of the simulated object based on an arrangement of object primitives that delineate the surface regions when mapped onto the exterior surface of the simulated object.

12. The system of claim 11, wherein each of the object primitives defines one or more attributes of a corresponding surface region.

13. The system of claim 12, wherein the attributes of the corresponding surface region include one or more of visibility information of the corresponding surface region, a polygon type of the corresponding surface region, a shape of the corresponding surface region, a size of the corresponding surface region, positions of vertices and edges of the corresponding surface region, relative placement of the corresponding surface region within a 3D space, and relative positioning of the corresponding surface region and at least one other surface region within the arrangement.

14. The system of claim 12, wherein the machine-learning model incrementally updates the surface regions of the mesh by incrementally modifying one or more attributes defined by the object primitives in the mesh to mirror an incremental change applied to the corresponding portions of the neural representation during each incremental update of the surface regions of the mesh.

15. The system of claim 12, wherein:

the machine-learning model incrementally updates the surface regions of the mesh by synchronizing each incremental update to the mesh with a corresponding incremental change applied to the neural representation; and gradients calculated based on differences between renderings of the mesh and renderings of the neural representation are propagated back through the machine-learning model to improve accuracy of the mesh mirroring the neural representation.

16. The system of claim 15, wherein the machine-learning model synchronizes each incremental update to the mesh with the corresponding incremental change applied to the neural representation using differentiable rendering that differentially renders both the mesh and the neural representation from a plurality of angles for using consistent color maps, opacity maps, and normal maps.

17. The system of claim 16, wherein:

the machine-learning model uses differentiable rendering to synchronize each incremental update to the mesh with the corresponding incremental change applied to the neural representation based on a loss function that compares renderings of the mesh to renderings of the neural representation; and the renderings of the mesh and the renderings of the neural representation each depict similar views of the simulated object under similar conditions.

18. A non-transitory computer readable storage medium comprising instructions that, when executed, configure at least one processing device to:

store a mesh that models an exterior surface of a simulated object, and a neural representation of the exterior surface; and execute a machine-learning model that causes a requested modification to one or more surface regions of the mesh based on user input by:

incrementally update the surface regions of the mesh based on applying incremental changes to the neural representation for achieving the requested modification within corresponding portions of the exterior surface of the neural representation; and output the mesh for use in rendering the simulated object with the requested modification.

19. The non-transitory computer readable storage medium of claim 18, wherein the instructions, when executed, further configure the at least one processing device to output a user interface that receives a user input indicative of the requested modification.

20. The non-transitory computer readable storage medium of claim 18, wherein the instructions, when executed, further configure the at least one processing device to output an updated mesh that includes the requested modification.

* * * * *